United States Patent
Sullam

(12) 
(10) Patent No.: US 7,555,664 B2
(45) Date of Patent: Jun. 30, 2009

(54) INDEPENDENT CONTROL OF CORE SYSTEM BLOCKS FOR POWER OPTIMIZATION

(75) Inventor: Bert Sullam, Bellevue, WA (US)

(73) Assignee: Cypress Semiconductor Corp., San Jose, CA (US)

( * ) Notice: Subject to any disclaimer, the term of this patent is extended or adjusted under 35 U.S.C. 154(b) by 529 days.

(21) Appl. No.: 11/343,841

(22) Filed: Jan. 31, 2006

(65) Prior Publication Data

US 2007/0180279 A1    Aug. 2, 2007

(51) Int. Cl.
G06F 1/32 (2006.01)
(52) U.S. Cl. .................... 713/324; 713/320
(58) Field of Classification Search .......... 713/300–340
See application file for complete search history.

(56) References Cited

U.S. PATENT DOCUMENTS

| | | | |
|---|---|---|---|
| 5,996,083 A * | 11/1999 | Gupta et al. | 713/322 |
| 6,169,680 B1 * | 1/2001 | Matsui et al. | 363/21.05 |
| 6,525,593 B1 | 2/2003 | Mar | |
| 6,665,802 B1 | 12/2003 | Ober | |
| 2004/0078117 A1 * | 4/2004 | Vanderah et al. | 700/301 |
| 2005/0264245 A1 * | 12/2005 | Donnelly | 318/139 |

* cited by examiner

*Primary Examiner*—Dennis M Butler

(57) ABSTRACT

Power management commands are provided to a power management unit of a processing device, wherein the power management unit coupled to a core system block of the processing device. Sampling of the core system block is performed in response to the power management commands by the power management unit, wherein sampling includes periodically powering the core system block.

20 Claims, 5 Drawing Sheets

INDEPENDENT CONTROL OF CORE SYSTEM BLOCKS FOR POWER OPTIMIZATION

TECHNICAL FIELD

Embodiments of the invention relate to the field of processing devices and more specifically, but not exclusively, to independent control of core system blocks for power optimization.

BACKGROUND

In today's microcontroller's, a manufacturer of a microcontroller usually provides the customer with a handful of predefined power modes. These power modes cannot be customized. Additionally, these predefined power modes are for settings for the whole microcontroller and do not offer customers independent control over particular blocks of the microcontroller.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the following description and claims, the term "coupled" and its derivatives may be used. "Coupled" may mean that two or more elements are in contact (physically, electrically, magnetically, optically, etc.). "Coupled" may also mean two or more elements are not in contact with each other, but still cooperate or interact with each other.

Figure 1:
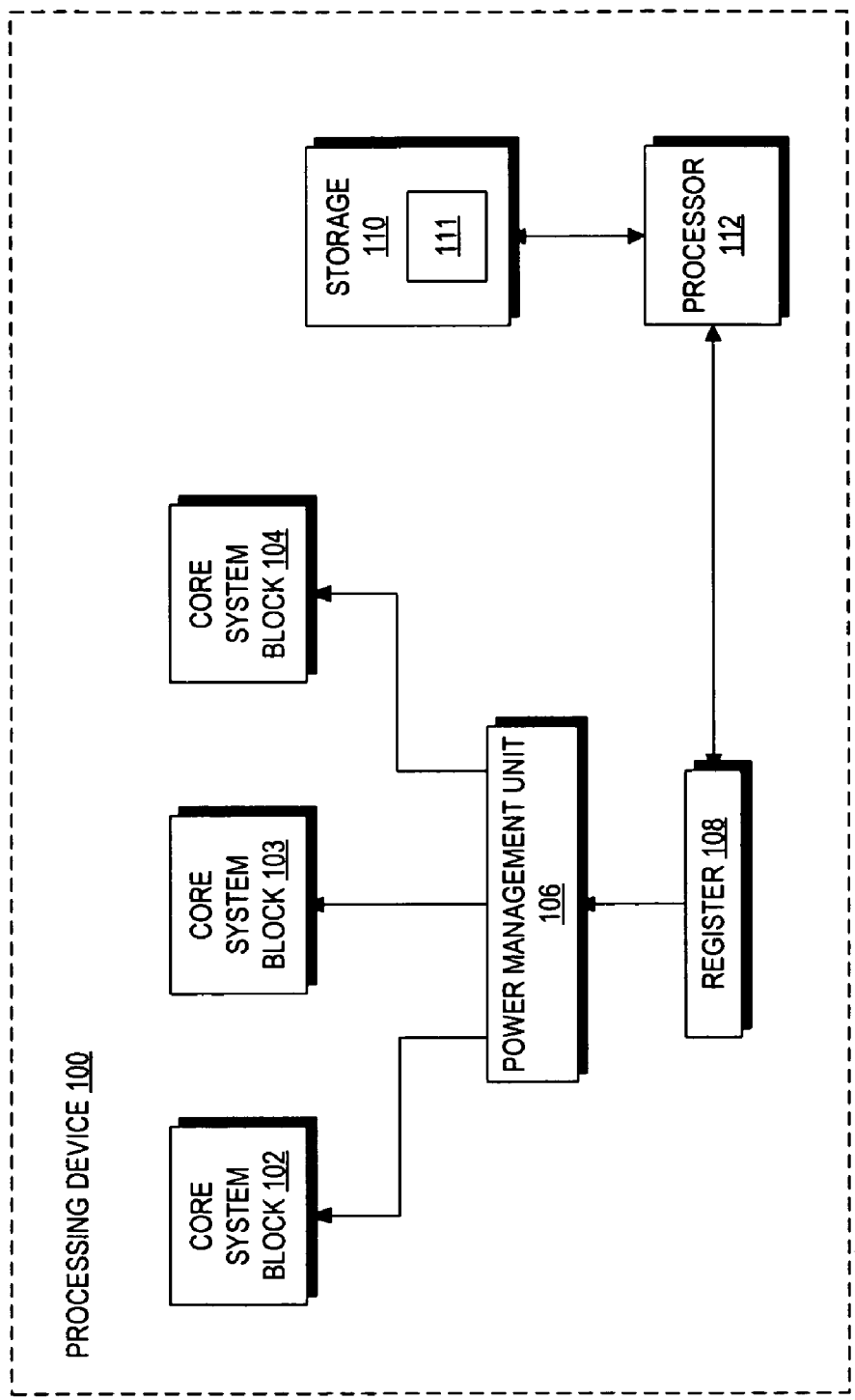
FIG. 1 is a diagram illustrating a processing device having independent control of core system blocks for power optimization in accordance with an embodiment of the invention.

Turning to FIG. 1, an embodiment of a processing device 100 having independent control of core system blocks for power optimization is shown. In one embodiment, processing device 100 includes a microcontroller. Processing device 100 may also include a desktop computer, a notebook computer, a handheld device, such as a mobile phone, a home electronics device, or the like.

Processing device 100 may include two levels of blocks: core system blocks and application level blocks. Processing device 100 includes core system blocks 102, 103, and 104. Each block 102-104 is coupled to a power management unit 106. Power management unit 106 provides independent power control of blocks 102-104. Each core system block may be coupled to another core system block or to an application level block.

Processing device 100 may include application level blocks, such as an Analog-to-Digital Converter (ADC), a Digital-to-Analog Converter (DAC), a comparator, or the like, for carrying out the particular application(s) of the processing device. Such application level blocks are often supported by core system blocks.

Core system blocks provide support to the application level blocks and operate below the application level. In one embodiment, a core system block includes an analog device. Embodiments of a core system block include a power supply monitor, a voltage reference, a voltage regulator, or the like. Core system blocks are conventionally not exposed to application programmers for their power consumption manipulation. Embodiments herein provide control of core system blocks for power optimization. Sampling may be performed on one or more core system blocks, where sampling includes periodically powering a core system block, to reduce average power consumption by the core system blocks.

In one embodiment, power management commands may be provided to power management unit 106 via one or more power management registers 108. In one embodiment, power management unit 106 includes a state machine that is responsive to values loaded into register 108. Alternative implementations in providing power management commands to power management unit 106 will be appreciated by one skilled in the art having the benefit of this description.

Embodiments herein provide decoded register control of power management unit 106 for customization of the power consumption of the core system blocks. The application programmer is not constrained to predefined power modes that may affect application level blocks but not core system blocks. Also, such pre-defined power modes may be hardwired into the device and not customizable by the application programmer.

During operation of processing device 100, a processor 112 may execute application code 111 stored in storage 110. Storage 110 may include Read-Only Memory (ROM), such as Flash memory, Random Access Memory (RAM), magnetic disk storage, optical disk storage, or the like. Application code 111 may include instructions for an application of processing device 100. Application code 111 may include power management commands in the form of instructions. These power management instructions may cause processor 112 to load particular values into power management register 108 which are decoded by power management unit 106 and applied to core system blocks 102-104. Each core system block may be independently controlled using power management unit 106.

Figure 2A:
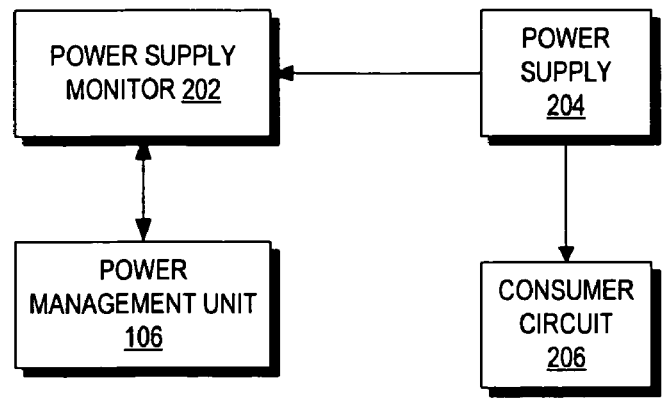
FIG. 2A is a diagram illustrating a power supply monitor in accordance with an embodiment of the invention.
Figure 2B:
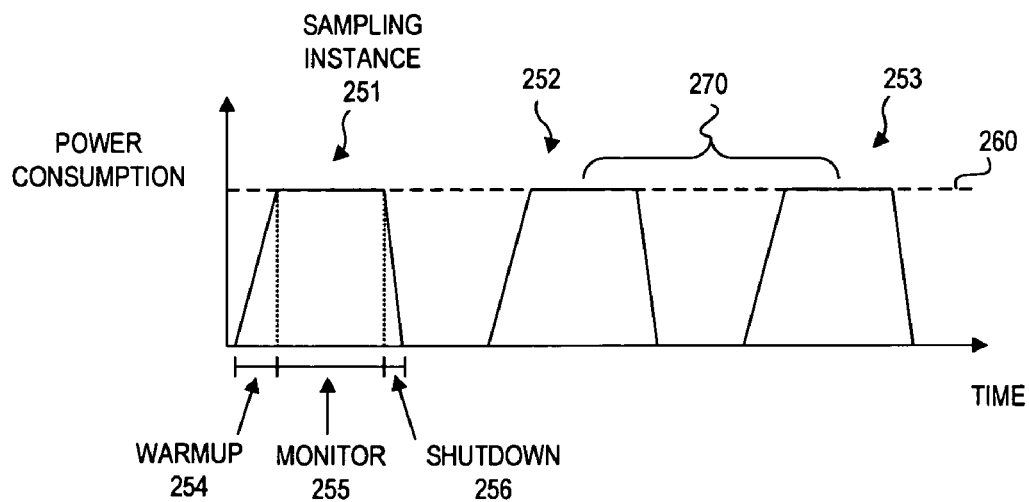
FIG. 2B is a graph illustrating sampling in accordance with an embodiment of the invention.

Turning to FIGS. 2A and 2B, an embodiment of independent control of a core system block is shown, where the core system block includes a power supply monitor 202. Power supply monitor 202 is coupled to power management unit 106. Power supply monitor 202 is used to monitor the output power of a power supply 204, such as a battery. The output power of power supply 204 is provided to a consumer circuit 206. Embodiments herein conserve the power used by power supply monitor 202 by periodically turning power supply monitor 202 on and off.

In FIG. 2B, a graph of sampling of power supply monitor 202 is shown. The vertical axis of FIG. 2B shows power consumption of power supply monitor 202; the horizontal axis shows time. Conventionally, power supply monitor 202 is kept in an on state consuming power at a continuous level, as shown by dotted line 260. In accordance with embodiments herein, power supply monitor 202 may be periodically turned on and off, referred to herein as sampling, to save power. The sampling may occur when processor 112 is awake or is in a sleep state.

Embodiments herein provide reduced average power consumption by power supply monitor 202. FIG. 2B shows sampling instances 251, 252, and 253. Sampling instances 251-253 occur periodically as defined by the power management unit 106. As shown in sampling instance 251, a sampling instance may include a warmup time 254, a monitor time 255, and a shutdown time 256. In one embodiment, since power supply monitor 202 includes analog circuitry, turning power supply monitor 202 on has an associated warmup time 254 and turning power supply monitor 202 off has an associated shutdown time 256. The sampling instance length may include the total time of warmup time 254, monitor time 255, and shutdown time 256.

Starting at sampling instance 251, turning power supply monitor 202 on begins warmup time 254. Once power supply monitor 202 reaches its operating power level, power supply monitor 202 may perform power monitoring of power supply 204, shown as monitor time 255. Once monitor time 255 ends, power supply monitor 202 is turned off and has an associated shutdown time 256. Power supply monitor 202 remains off until the next sampling instance 252 begins when power supply monitor 202 is turned on again.

In one embodiment, the power output of power supply 204 is usually fairly steady, and thus, the power output of power supply 204 does not have to be continuously monitored. For example, a battery may run down slowly with no quick changes in output power. Since the output power of power supply 204 is not expected to fluctuate rapidly, the output power of power supply 204 does not have to be monitored continuously by power supply monitor 202. Since power supply monitor 202 consumes power when monitoring power supply 204, periodic monitoring by power supply monitor 202 saves power as compared to having power supply monitor 202 operate continuously.

FIG. 2B shows a sampling period 270 between the midpoints of sampling instances 252 and 253. Sampling period 270 includes the amount of time between sampling instances and may be set as desired. It will be understood that a sampling period may also be construed conversely as a sampling rate. Also, the length of time of a sampling instance may be set as desired. In one embodiment, changing monitor time 255 is used to adjust the sampling instance length. It will be appreciated that embodiments herein may also be used to keep power supply monitor 202 continuously off or continuously on if desired for the processing device application.

Figure 3A:
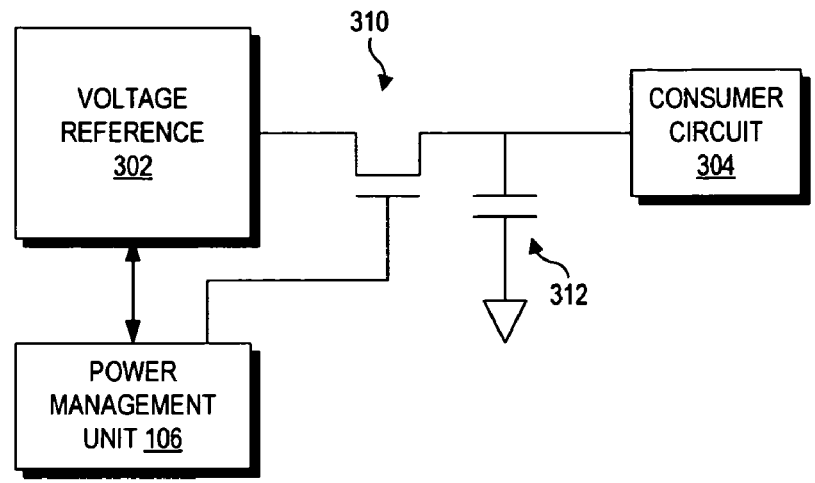
FIG. 3A is a diagram illustrating a voltage reference in accordance with an embodiment of the invention.
Figure 3B:
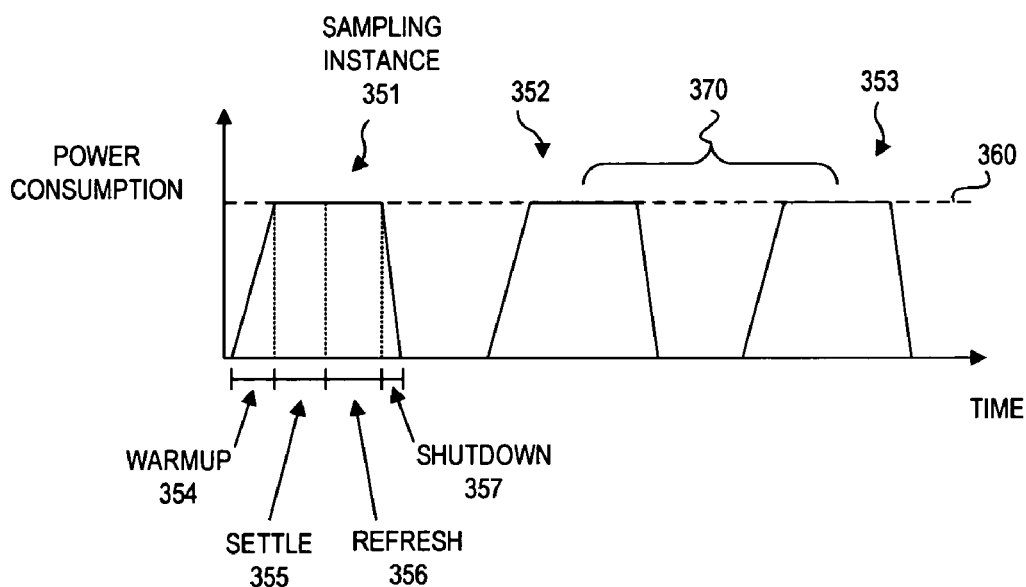
FIG. 3B is a graph illustrating sampling in accordance with an embodiment of the invention.

Turning to FIGS. 3A and 3B, an embodiment of independent control of a core system block is shown, where the core system block includes a voltage reference 302. One skilled in the art having the benefit of this description will appreciate how the embodiment of FIGS. 3A and 3B may be implemented with a voltage regulator core system block.

Power management unit 106 is coupled to voltage reference 302. The output of voltage reference 302 is coupled to the input of a sampling switch 310. Power management unit 106 is coupled to sampling switch 310 and controls sampling switch 310. The output of sampling switch 310 is coupled to consumer circuit 304. Consumer circuit 304 includes a circuit that uses the output of voltage reference 302. Consumer circuit 304 may include an application level circuit such as a comparator, a DAC, an ADC, or another core system block.

FIG. 3B shows a graph having power consumption of voltage reference 302 on the vertical axis and time on the horizontal axis. Conventionally, voltage reference 302 is continuously powered as shown by dotted line 360. In accordance with embodiments herein, voltage reference may be periodically turned on and off to reduce the amount of average power consumed by voltage reference 302. Periodically powering voltage reference 302 (i.e., periodically turning voltage reference 302 on and off) is referred to herein as sampling.

FIG. 3B shows sampling instances 351, 352, and 353. Sampling instances 351-353 occur periodically as defined by the power management unit 106. As shown in sampling instance 351, a sampling instance may include a warmup time 354, a settle time 355, a refresh time 356, and a shutdown time 357. In one embodiment, voltage reference 302 is an analog circuit. The sampling instance length may include the sum of warmup time 354, settle time 355, refresh time 356, and shutdown time 357.

Warmup time 354 is the time during which voltage reference 302 is turned on and warms up. Settle time 355 includes the time the voltage reference 302 settles to its configured output voltage. During warmup time 354 and settle time 355, sampling switch 310 is open to prevent the voltage reference output from reaching consumer circuit 304 until voltage reference 302 reaches the proper output voltage.

During settle time 355, power management unit 106 may test the output of voltage reference 302 to confirm voltage reference 302 has reached the correct output voltage. In alternative embodiments, other circuitry may test the voltage reference output.

Once voltage reference 302 has settled to the correct output voltage, sampling switch 310 is closed to allow the output voltage to pass to consumer circuit 304. Refresh time 356 shows the time when the voltage reference output is allowed to pass to consumer circuit 304. In one embodiment, refresh time 356 begins and ends with the closing and opening of sampling switch 310.

After refresh time 356, voltage reference 302 is turned off, as shown by shutdown time 357. Voltage reference 302 remains off until the next sampling instance 352 begins.

A sampling period 370 between sampling instances may be set as desired. Also, the length of a sampling instance may be set as desired through power management unit 106. In one embodiment, the length of the sampling instance may be configured by setting the length of refresh time 356. It will be appreciated that voltage reference 302 may be controlled to be always off or to be always on, and does not necessarily have to be periodically turned on and off.

In one embodiment, a charge cell, represented by a capacitor 312, may be coupled to sampling switch 310 and consumer circuit 304 to hold a charge from the voltage reference output between refresh times. This particular embodiment may be used with consumer circuits that may not require a highly accurate voltage reference since some leakage may occur at the charge cell.

In another embodiment, the refresh time during which the voltage reference output passes to consumer circuit 304 and the time that consumer circuit 304 uses the voltage reference output may be coordinated. In this case, the consumer circuit 304 receives a reference voltage that has not degraded in a charge cell. This particular embodiment may be utilized when consumer circuit 304 may require a highly accurate voltage reference.

Embodiments herein provide a high granularity of control over power consumed by core system blocks of a processing device. Power management unit 106 may be coupled to one or more core system blocks of various types. Each of these core system blocks may be controlled independently. Also, power consumption factors of each core system block, such as sampling period or sampling instance length, may be controlled independently at each core block. In accordance with embodiments herein, power management unit 106 may control sampling of core system blocks while processor 112 is in a sleep mode or is awake.

Figure 4:
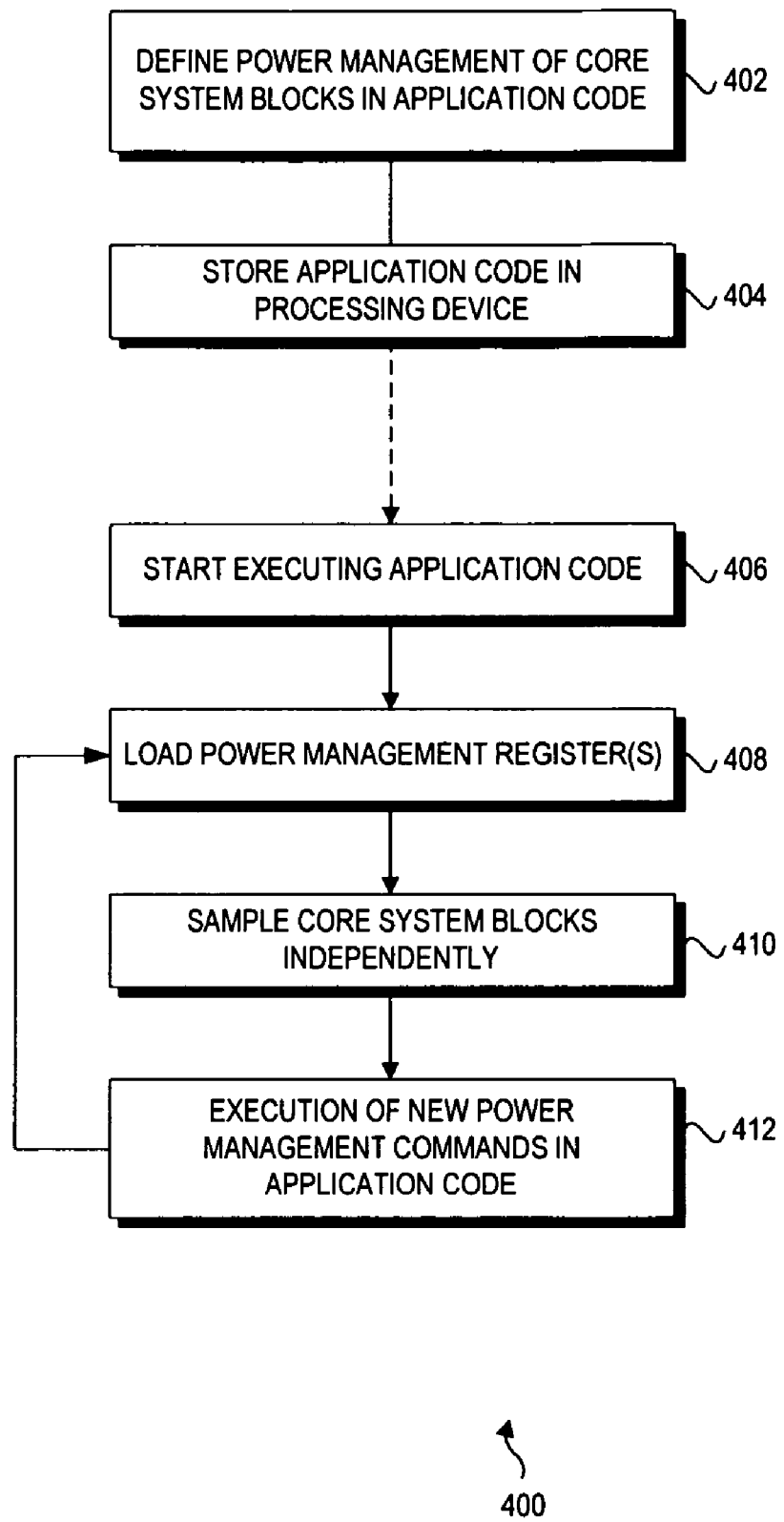
FIG. 4 is a flowchart illustrating the logic and operations of independent control of core system blocks for power optimization in accordance with an embodiment of the invention.

Turning to FIG. 4, a flowchart 400 in accordance with an embodiment of the invention is shown. Starting in a block 402, power management of one or more core system blocks is defined in application code for a processing device. In one embodiment, application code 111 may provide power management commands to power management unit 106 using one or more power management registers 108.

Continuing to a block 404, the application code, including core system block power consumption optimizations, is stored in the processing device. In one embodiment, the application code is stored in storage 110. It will be appreciated that the logic of blocks 402 and 404 may occur during development of an application for processing device 100.

The following blocks 406, 408, 410, and 412 may occur during operation of processing device 100. In a block 406, the execution of application code is started. In a block 408, one or more power management registers for use with the power management unit are loaded with values as defined by the application code. These values are associated with power management commands for the power management unit.

Continuing to a block 410, sampling of one or more core system blocks is performed as directed by the power management unit. The sampling does not have to be performed on all core system blocks of the processing device, but may be performed on select core system blocks. The sampling period (conversely sampling rate) and/or the length of the sampling instances may be controlled independently for each core system block. In one embodiment, the sampling may occur when processor 112 is asleep since the sampling is controlled by power management unit 106.

The sampling at block 410 may continue until an execution of new power management commands occurs in the application code, as shown in a block 412. These new commands may cause new values to be loaded into the power management registers, as shown by the return arrow to block 408. As the application code executes, the power management registers may be loaded with different values as defined in the application code to change the sampling of one or more core system blocks by the power management unit.

Embodiments herein provide the application programmer control over the power consumption of individual core system blocks. Power consumption may be defined by the application programmer and applied during operation of the processing device through decoded register control. The application programmer may determine which blocks to control as well as the sampling period and sampling instance length of those blocks.

Figure 5:
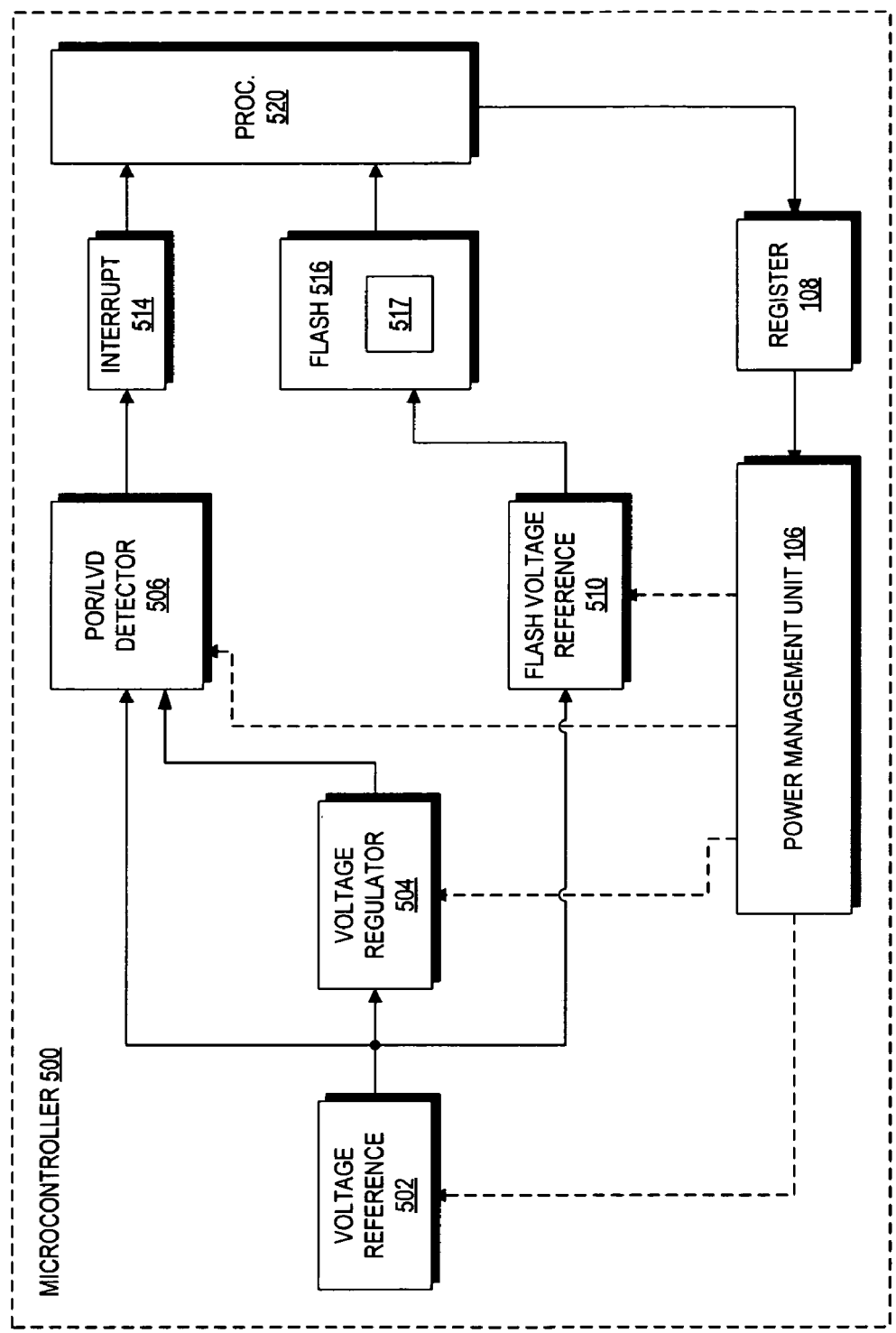
FIG. 5 is a diagram illustrating a microcontroller having independent control of core system blocks for power optimization in accordance with an embodiment of the invention.

Turning to FIG. 5, a microcontroller 500 in accordance with an embodiment of the invention is shown. Microcontroller 500 includes power management register 108 coupled to power management unit 106. Power management unit 106 is coupled to the following core system blocks: a voltage reference 502, a voltage regulator 504, a Power-On-Reset/Low Voltage Detector (POR/LVD) 506, and a Flash voltage reference 510. Voltage regulator 504 may provide power to various components (not shown) of microcontroller 500. POR/LVD 506 is an embodiment of a power supply monitor.

Voltage reference 502 is coupled to voltage regulator 504. Voltage regulator 504 is coupled to POR/LVD Detector 506. POR/LVD Detector 506 is coupled to an interrupt unit 514 which is coupled to a processor 520. Voltage reference 502 is also coupled to Flash voltage reference 510. Flash voltage reference 510 is coupled to Flash memory 516 which is coupled to processor 520.

Processor 520 is coupled to power management register 108. Application code 517 stored in Flash 516 and executed by processor 520 may cause power management register 108 to be loaded by processor 520 with values corresponding to power management commands in application code 517. In one embodiment, processor 520 communicates with register 108 using a system bus. Power management unit 106 controls core system blocks of microcontroller 500 in response to the values loaded in register 108.

For the purposes of the specification, a machine-readable medium includes any mechanism that provides (i.e., stores) information in a form readable or accessible by a machine (e.g., a computer, network device, personal digital assistant, manufacturing tool, any device with a set of one or more processors, etc.). For example, a machine-readable medium includes, but is not limited to, recordable/non-recordable media (e.g., Read-Only Memory (ROM), Random Access Memory (RAM), magnetic disk storage media, optical storage media, a flash memory device, etc.).

Various operations of embodiments of the present invention are described herein. These operations may be implemented using hardware, software, or any combination thereof. These operations may be implemented by a machine using a processor, an Application Specific Integrated Circuit (ASIC), a Field Programmable Gate Array (FPGA), or the like. In one embodiment, one or more of the operations described may constitute instructions stored on a machine-readable medium, that if executed by a machine, will cause the machine to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of illustrated embodiments of the invention, including what is described in the Abstract, is not intended to be exhaustive or to limit the embodiments to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description. The terms used in the following claims should not be construed to limit the invention to the specific embodiments disclosed in the specification.

Rather, the following claims are to be construed in accordance with established doctrines of claim interpretation.

What is claimed is:

1. A method, comprising:
providing power management commands to a power management unit of a processing device, wherein the power management unit is coupled to a core system block of the processing device, wherein the power management commands are provided to the power management unit under control of a processor of the processing device; and
sampling the core system block under control of the power management unit and in response to the power management commands, wherein sampling includes periodically powering the core system block while the processor is in a sleep mode.

2. The method of claim 1 wherein the core system block includes a power supply monitor, wherein sampling includes periodically powering the power supply monitor to monitor an output power of a power supply coupled to the power supply monitor.

3. The method of claim 1 wherein the core system block includes a voltage reference, wherein sampling includes periodically powering the voltage reference.

4. The method of claim 3 wherein the voltage reference is coupled to a sampling switch, the sampling switch to allow a voltage reference output to pass to a consumer circuit during a sampling instance.

5. The method of claim 1 wherein the power management commands are provided to the power management unit via a power management register coupled to the power management unit.

6. The method of claim 5, further comprising:
executing instructions by a processor of the processing device, wherein the instructions initiate the loading of the power management register with values associated with the power management commands.

7. The method of claim 6, further comprising:
defining the power management commands in the instructions; and
storing the instructions in a storage unit of the processing device.

8. The method of claim 1 wherein sampling occurs while a processor of the processing device is in a sleep mode.

9. An article of manufacture, comprising:
a computer-readable storage medium including instructions that, if executed, cause operations comprising:
providing power management commands to a power management unit of a processing device under control of a processor of the processing device, wherein the power management unit is coupled to a core system block of the processing device,
wherein the power management unit is responsive to the power management commands to control sampling of the core system block, wherein sampling includes periodically powering the core system block while the processor is in a sleep mode.

10. The article of manufacture of claim 9 wherein the core system block includes a power supply monitor, wherein sampling includes periodically powering the power supply monitor to monitor an output power of a power supply coupled to the power supply monitor.

11. The article of manufacture of claim 9 wherein the core system block includes a voltage reference, wherein sampling includes periodically powering the voltage reference.

12. The article of manufacture of claim 11 wherein providing the power management commands includes loading a power management register coupled to the power management unit with values associated with the power management commands.

13. The article of manufacture of claim 9 wherein the instructions are part of an application code stored in the processing device.

14. A processing device, comprising:
a core system block;
a power management unit coupled to the core system block;
a processor coupled to the power management unit; and
a storage unit coupled to the processor, wherein the storage unit including instructions that, if executed by the processor, will cause the processor to perform operations comprising:
providing power management commands to the power management unit, wherein the power management unit is responsive to the power management commands to perform sampling of the core system block, wherein sampling includes periodically powering the core system block while the processor is in a sleep mode.

15. The processing device of claim 14 wherein the core system block includes a power supply monitor, wherein sampling includes periodically powering the power supply monitor to monitor an output power of a power supply coupled to the power supply monitor.

16. The processing device of claim 14 wherein the core system block includes a voltage reference, wherein sampling includes periodically powering the voltage reference.

17. The processing device of claim 16 wherein the voltage reference is coupled to a sampling switch, the sampling switch to allow a voltage reference output to pass to a consumer circuit during a sampling instance.

18. The processing device of claim 14, further comprising a power management register coupled between the processor and the power management unit, wherein providing the power management commands includes loading the power management register with values associated with the power management commands.

19. The processing device of claim 14, further comprising a second core system block, wherein sampling of the second core system block is independent of the sampling of the core system block.

20. The processing device of claim 14 wherein the instructions are part of an application code stored in the storage unit.

* * * * *